US012645883B2

(12) United States Patent
Gong et al.

(10) Patent No.: US 12,645,883 B2
(45) Date of Patent: Jun. 2, 2026

(54) APPLICATION SPECIFIC AUTO-EVALUATION FOR LARGE LANGUAGE MODELS (LLMs)

(71) Applicant: Oracle International Corporation, Redwood Shores, CA (US)

(72) Inventors: Liyu Gong, Lexington, KY (US); Michael Avendi, Irvine, CA (US); Yuying Wang, Redmond, WA (US); Tao Sheng, Bellevue, WA (US); Jun Qian, Bellevue, WA (US); Vinod Mamtani, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 18/774,571

(22) Filed: Jul. 16, 2024

(65) Prior Publication Data

US 2026/0023929 A1     Jan. 22, 2026

(51) Int. Cl.
*G06F 40/30*          (2020.01)

(52) U.S. Cl.
CPC .................................... *G06F 40/30* (2020.01)

(58) Field of Classification Search
CPC ........... G06F 40/30; G06F 15/00; G10L 15/00
See application file for complete search history.

(56) References Cited

U.S. PATENT DOCUMENTS 11,875,130 B1 * 1/2024 Bosnjakovic .......... G06N 3/042
12,515,075 B2 * 1/2026 Kuusela ............... A61N 5/1031

2022/0201021 A1 * 6/2022 Joshi ................... H04L 63/1416
2023/0316090 A1 * 10/2023 Chakraborty ............ G06F 9/54
                                                       706/15
2024/0362422 A1 * 10/2024 Callegari ............... G06F 9/543
(Continued)

FOREIGN PATENT DOCUMENTS

CN          117171536 A      12/2023
CN          117194258 A      12/2023
(Continued)

OTHER PUBLICATIONS

Yongqiang Ma; et al.; From Model-centered to Human-Centered: Revision Distance as a Metric for Text Evaluation in LLMs-based Applications; Apr. 11, 2024.
(Continued)

*Primary Examiner* — Michael Colucci
(74) *Attorney, Agent, or Firm* — Baker Botts L.L.P.

(57) ABSTRACT

In one embodiment, a non-transitory computer-readable media stores instructions executable by processors for generating a prompt configured for eliciting outputs from large language models (LLMs) based on information associated with a task, inputting the prompt to a first LLM configured to output a response based on processing the prompt, determining metrics for evaluating the first LLM based on the task, wherein each of the metrics is associated with a scoring guideline, generating metric prompts based on the respective metrics and the scoring guidelines associated with the respective metrics, inputting the response and the metric prompts to second LLMs configured to output scores corresponding to the respective metrics based on processing the response and the metric prompts, and generating an analysis report based on the metrics and their corresponding scores.

20 Claims, 3 Drawing Sheets

(56) References Cited

U.S. PATENT DOCUMENTS

| | | | | |
|---|---|---|---|---|
| 2024/0428015 A1* | 12/2024 | Yoon | | G06F 40/40 |
| 2025/0077844 A1* | 3/2025 | Lin | | G06N 3/0475 |
| 2025/0086211 A1* | 3/2025 | Bolcer | | G06F 16/3344 |
| 2025/0111147 A1* | 4/2025 | Pryzant | | G06F 40/56 |
| 2025/0111167 A1* | 4/2025 | Mcintyre | | G06F 16/383 |
| 2025/0260707 A1* | 8/2025 | Belgi | | H04L 63/1433 |
| 2025/0291934 A1* | 9/2025 | Chan | | G06F 40/20 |
| 2025/0335858 A1* | 10/2025 | Stavarache | | G06Q 10/06393 |

FOREIGN PATENT DOCUMENTS

| | | | | |
|---|---|---|---|---|
| CN | 117573846 A | 2/2024 | | |
| CN | 117667635 A | 3/2024 | | |
| WO | WO-2024177227 A1 * | 8/2024 | | G16Y 40/10 |
| WO | WO-2025017427 A1 * | 1/2025 | | G06N 20/00 |

OTHER PUBLICATIONS

Arthur Team; LLM-Guided Evaluation: Using LLMs to Evaluate LLMs; https://www.arthur.ai/blog/llm-guided-evaluation-using-llms-to-evaluate-llms; Sep. 29, 2023.

Yang Liu, et al.; G-Eval: NLG Evaluation using GPT-4 with Better Human Alignment; May 23, 2023.

Qingqing Zhu et al.; How Well Do Multi-modal LLMs Interpret CT Scans? An Auto-Evaluation Framework for Analyses; Jun. 18, 2024.

Jeffrey Zhou et al.; Instruction-Following Evaluation for Large Language Models; Nov. 14, 2023.

Yen-Ting Lin, et al.; National Taiwan University, Taipei, Taiwan; "LLM-EVAL: Unified Multi-Dimensional Automatic Evaluation for Open-Domain Conversations with Large Language Models;" May 23, 2023.

Zingyao Wang, et al.; "MINT: Evaluating LLMs in Multi-Turn Interaction with Tools and Language Feedback;" Published as a conference paper at ICLR 2024.

Patentability Search Report; Ref. No: IDF-138335; Apr. 12, 2024.

Arthur Team; "The Most Robust Way to Evaluate LLMs;" https://www.arthur.ai/product/bench; Arthur Bench; Printed Feb. 3, 2025.

* cited by examiner

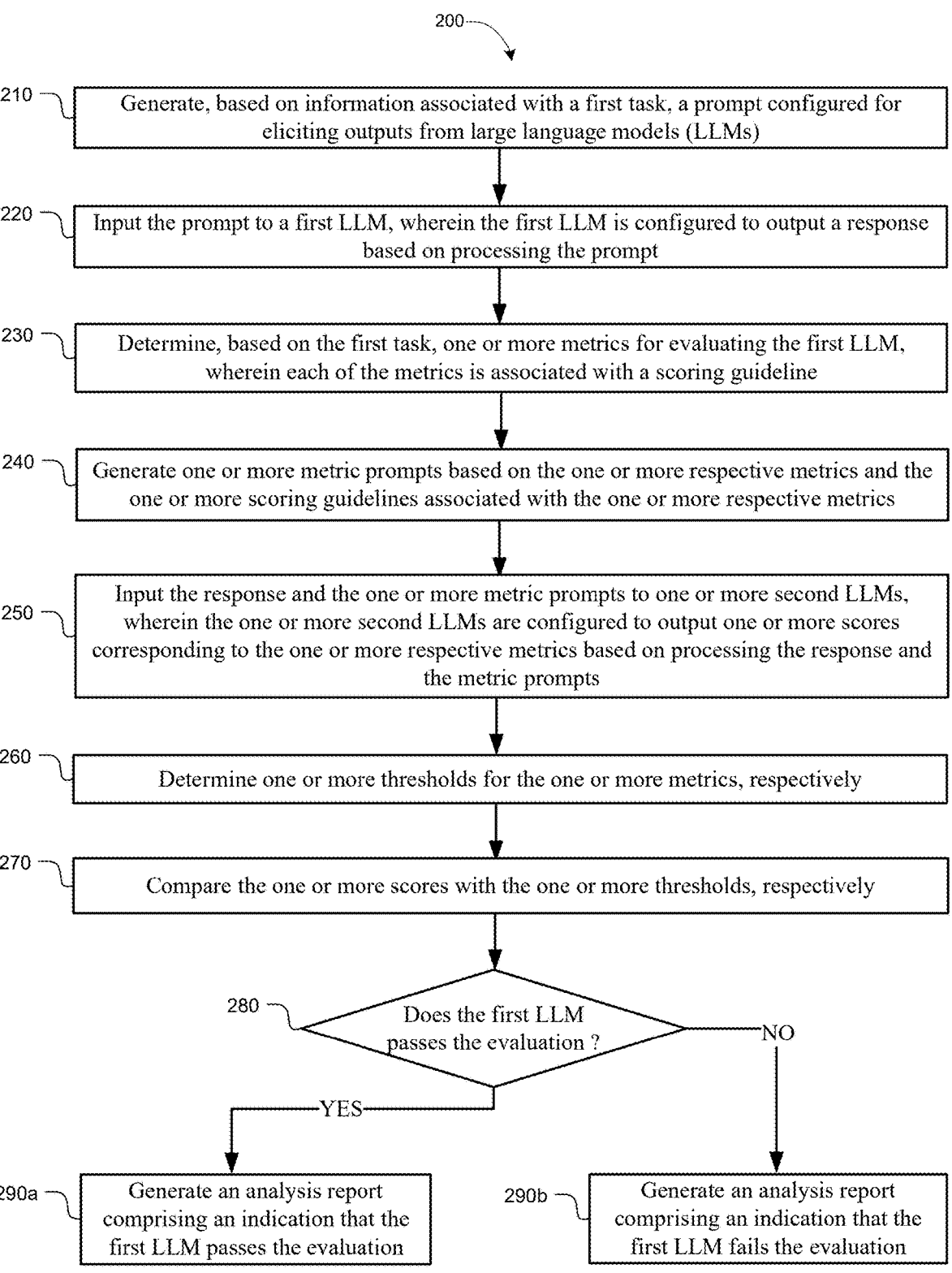

200

210  Generate, based on information associated with a first task, a prompt configured for eliciting outputs from large language models (LLMs)

220  Input the prompt to a first LLM, wherein the first LLM is configured to output a response based on processing the prompt 230  Determine, based on the first task, one or more metrics for evaluating the first LLM, wherein each of the metrics is associated with a scoring guideline 240  Generate one or more metric prompts based on the one or more respective metrics and the one or more scoring guidelines associated with the one or more respective metrics 250  Input the response and the one or more metric prompts to one or more second LLMs, wherein the one or more second LLMs are configured to output one or more scores corresponding to the one or more respective metrics based on processing the response and the metric prompts 260  Determine one or more thresholds for the one or more metrics, respectively 270  Compare the one or more scores with the one or more thresholds, respectively 280  Does the first LLM passes the evaluation ?

YES

NO

290a  Generate an analysis report comprising an indication that the first LLM passes the evaluation 290b  Generate an analysis report comprising an indication that the first LLM fails the evaluation

*FIG. 2*

APPLICATION SPECIFIC AUTO-EVALUATION FOR LARGE LANGUAGE MODELS (LLMs)

TECHNICAL FIELD

This disclosure generally relates to large language models.

BACKGROUND

A large language model (LLM) is a computational model notable for its ability to achieve general-purpose language generation and other natural language processing tasks such as classification. Based on language models, LLMs acquire these abilities by learning statistical relationships from text documents during a computationally intensive self-supervised and semi-supervised training process. LLMs can be used for text generation, a form of generative artificial intelligence (AI), by taking an input text and repeatedly predicting the next token or word.

A large number of testing datasets and benchmarks have been developed to evaluate the capabilities of language models on downstream tasks. Tests may be designed to evaluate a variety of capabilities, including general knowledge, commonsense reasoning, and mathematical problem-solving. One broad category of evaluation dataset is question answering datasets, consisting of pairs of questions and correct answers. A question answering task is considered "open book" if the model's prompt includes text from which the expected answer can be derived. Otherwise, the task is considered "closed book", and the model must draw on knowledge retained during training. Evaluation datasets may also take the form of text completion, having the model select the most likely word or sentence to complete a prompt. Some composite benchmarks have also been developed which combine a diversity of different evaluation datasets and tasks. It was previously standard to report results on a held-out portion of an evaluation dataset after doing supervised fine-tuning on the remainder. It is now more common to evaluate a pre-trained model directly through prompting techniques, though researchers vary in the details of how they formulate prompts for particular tasks, particularly with respect to how many examples of solved tasks are adjoined to the prompt.

BRIEF DESCRIPTION OF THE DRAWINGS

FIG. 2 illustrates an example method for application specific evaluation of an LLM, according to at least one embodiment.

DESCRIPTION OF EXAMPLE EMBODIMENTS

Overview

Figure 1:
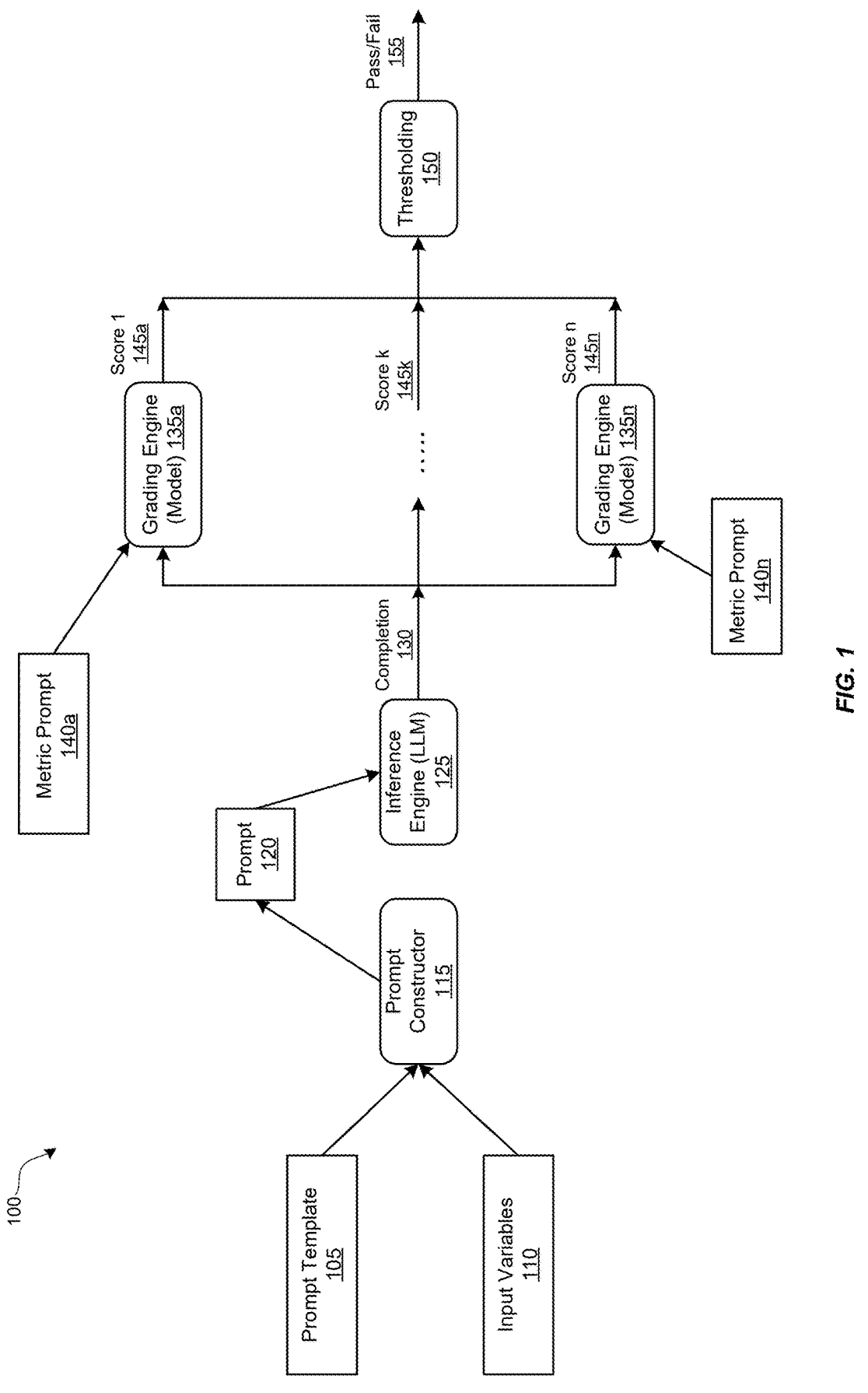
FIG. 1 illustrates an overview of use case specific LLM evaluation, according to at least one embodiment.

According to an embodiment, one or more computer-readable non-transitory storage media stores instructions that, when executed by one or more processors, cause performance of the following operations. The operations include generating a prompt configured for eliciting outputs from large language models (LLMs) based on information associated with a first task. The operations also include inputting the prompt to a first LLM. The first LLM is configured to output a response based on processing the prompt. The operations additionally include determining one or more metrics for evaluating the first LLM based on the first task. Each of the metrics is associated with a scoring guideline. The operations also include generating one or more metric prompts based on the one or more respective metrics and the one or more scoring guidelines associated with the one or more respective metrics. The operations additionally include inputting the response and the one or more metric prompts to one or more second LLMs. The one or more second LLMs are configured to output one or more scores corresponding to the one or more respective metrics based on processing the response and the metric prompts. The operations further include generating an analysis report based on the one or more metrics and their corresponding scores.

In certain embodiments, the operations include generating one or more examples for each of the one or more metrics and injecting the examples to each of the metric prompts associated with the respective metric. Each of the examples comprises one or more of a demo, a reference score for the demo, or an explanation for the reference score.

In certain embodiments, the operations include determining one or more thresholds for the one or more metrics, respectively. The one or more thresholds are determined based on one or more requirements associated with the first task. The operations then include comparing the one or more scores with the one or more thresholds, respectively. The operations further include determining whether the first LLM passes or fails the evaluation based on the comparison. In an embodiment, the operations additionally include determining all the metrics exceed their respective thresholds and based at least in part on said determining all the metrics exceed their respective thresholds, determining the first LLM passes the evaluation. The analysis report comprises an indication that the first LLM passes the evaluation. In another embodiment, the operations additionally include determining one or more of the metrics are lower than their corresponding thresholds and based at least in part on said determining one or more of the metrics are lower than their corresponding thresholds, determining the first LLM fails the evaluation. The analysis report comprises an indication that the first LLM fails the evaluation. In yet another embodiment, the operations additionally include inputting the prompt to the first LLM for a plurality of respective times. The first LLM is configured to output a plurality of respective responses based on processing the prompt for the plurality of respective times. The operations then include determining a plurality of sets of one or more scores corresponding to the one or more respective metrics based on processing the plurality of response and the metric prompts by the one or more second LLMs. The operations then include calculating a pass-rate for the first LLM based on determining whether the first LLM passes or fails the evaluation for each of the plurality of times. The analysis report comprises the pass-rate.

In certain embodiments, the operations include generating, based on one or more of the metric prompts, one or more metric functions configured to be re-used for one or more second tasks.

In certain embodiments, generating the prompt is based on a prompt template and one or more input variables associated with the first task. Each of the input variables comprises a pair of variable name and value.

In certain embodiments, the metrics comprise one or more of tone, natural language quality, variety, repetitiveness, content classification, content relevance, JSON format, or length.

In certain embodiments, one or more of the metrics are shareable between the first task and one or more second tasks.

In certain embodiments, the one or more second LLMs are based on a same model.

In certain embodiments, one or more of the second LLMs are based on different models.

According to another embodiment, a system includes one or more processors and a non-transitory memory coupled to the processors comprising instructions, when executed by the processors, cause the system to execute the following operations. The operations include generating a prompt configured for eliciting outputs from large language models (LLMs) based on information associated with a first task. The operations also include inputting the prompt to a first LLM. The first LLM is be configured to output a response based on processing the prompt. The operations additionally include determining one or more metrics for evaluating the first LLM based on the first task. Each of the metrics is associated with a scoring guideline. The operations also include generating one or more metric prompts based on the one or more respective metrics and the one or more scoring guidelines associated with the one or more respective metrics. The operations additionally include inputting the response and the one or more metric prompts to one or more second LLMs. The one or more second LLMs are configured to output one or more scores corresponding to the one or more respective metrics based on processing the response and the metric prompts. The operations further include generating an analysis report based on the one or more metrics and their corresponding scores.

According to yet another embodiment, a method includes generating a prompt configured for eliciting outputs from large language models (LLMs) based on information associated with a first task. The method also includes inputting the prompt to a first LLM. The first LLM is configured to output a response based on processing the prompt. The method additionally includes determining one or more metrics for evaluating the first LLM based on the first task. Each of the metrics is associated with a scoring guideline. The method also includes generating one or more metric prompts based on the one or more respective metrics and the one or more scoring guidelines associated with the one or more respective metrics. The method additionally includes inputting the response and the one or more metric prompts to one or more second LLMs. The one or more second LLMs are configured to output one or more scores corresponding to the one or more respective metrics based on processing the response and the metric prompts. The method further includes generating an analysis report based on the one or more metrics and their corresponding scores.

Technical advantages of certain embodiments of this disclosure may include one or more of the following. The disclosed system and method can capture detailed, important, and specific perspective of the LLM performance for specific use cases. The disclosed system and method can also generate evaluation results that can be easily understood by different users as the metrics and the summary pass-rate score disclosed herein are highly aligned with human evaluation. The disclosed system and method can produce comprehensive results for detailed analysis, which is useful for model quality improvement. The disclosed system and method can be easy to manage and deploy as the metrics disclosed herein do not depend on pre-trained natural-language processing (NLP) or machine-learning models. The disclosed system and method can be easily scalable to support new use cases as it is easy to add new subjective metrics.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In particular embodiments, an evaluation system may perform application specific evaluation of a large language model (LLM). The evaluation system may first generate a prompt based on a prompt template and input variables specific to an application. The generated prompt may be fed into the testing LLM, which outputs a response accordingly. The evaluation system may then access metrics designed for the application based on human evaluation experience. Those metrics may be converted to metric prompts, which are fed into an evaluation LLM together with the response generated by the testing LLM. The evaluation LLM may output scores for these metrics. A threshold may be then applied to each of the scores to determine whether the testing LLM passes or fails the testing. The aforementioned process may repeat for multiple rounds, based on which a pass-rate can be calculated as the evaluation for the testing LLM. Although this disclosure describes evaluating particular language models by particular system in a particular manner, this disclosure contemplates evaluating any suitable language model by any suitable system in any suitable manner.

As the widespread adoption of LLMs continues, there is a huge and increasing demand on evaluating the performance of LLMs for different applications. Existing automatic evaluation approaches of LLMs may be based on some general-purpose objective scores such as ROGUE and BERT scores. These general-purpose objective scores may be calculated by comparing the similarity of the LLM output against a corresponding reference output. However, these existing metrics may have the following limitations.

One limitation may be that some of the existing metrics may require a reference output for evaluation, which may be costly to procure. Moreover, within most contexts, suitable reference outputs can differ widely in content. Take job-posting generation for example. Excellent job postings can feature entirely different content. Consequently, existing metrics such as ROGUE or BERT scores that are drawn from the relation between the LLM output and the reference output may not accurately reflect the actual quality of the LLM.

Another limitation may be that the majority of these metrics gauge the overall text generation ability, despite most applications, particularly those with high quality standards, prioritizing detailed and application specific criterion. For example, when an LLM is tasked to answer a question, it is desired to avoid outputs that redundantly rephrase the question, considering the answer might be displayed on a user interface with the question poised above it. Further repetition of the question within the answer may adversely impact user experience. Existing metrics such as ROGUE or BERT scores may be unable to effectively capture these types of failures.

Another limitation may be that crucially detailed criteria specific to an application may be often subjective, making them difficult to quantify with these existing metrics.

Another limitation may be that the existing metrics may rely on pre-trained natural language processing (NLP) models. Updating or retraining these NLP models may consume time and recourses. Moreover, incorporating support for many specific criteria may require numerous models of this kind, making it non-scalable.

Because of the above limitations, in many use cases, human evaluation may be required to assess these specific, detailed, and subjective criteria to evaluate LLM performance. Human evaluation may take time and resources, which is not scalable as well. As a result, an auto-evaluation method which is capable of assessing these detailed, application specific, subjective criteria may be highly demanded. The present disclosure presents a novel approach for evaluation of LLMs, addressing the limitations of the existing metrics. Particular embodiments may develop subject metrics with detailed guidelines for human evaluation first. These metrics with guidelines may enable a human evaluator without domain knowledge to evaluate the performance of an LLM output by examining the text content. These metrics may be transposed into evaluation prompts, applied to an evaluating LLM assessing the metrics in replacement of human evaluators. Because both human and auto evaluation share the same set of metrics and guidelines, the evaluations by human and auto evaluation are naturally aligned. Additionally, to facilitate clear communication, the performance measurement of an LLM may be condensed into a single pass-rate number, which is also proved effective according to human evaluation experience.

FIG. 1 illustrates an overview 100 of use case specific LLM evaluation, according to at least one embodiment. The auto-evaluation disclosed herein is application (use case) oriented, which means different metrics may be selected/configured for each application. The overall evaluation process illustrated in FIG. 1 is exemplified with the application of job posting generation.

For each application, at least one prompt template 105 and one set of input variables 110 may be required. For example, the prompt template 105 may be "generate a job posting for {job_role}, output a JSON object with the following keys . . . ". Correspondingly, the input variables may include {"job_role": "software engineer"}.

A prompt constructor 115 may take the prompt template 105 and the input variables 110 and replace the variables in the prompt template 105 with the values of input variables 110 to get the actual prompt 120 for the specific data point. For example, the generated prompt 120 may be "generate a job posting for software engineer, output a JSON object with the following keys . . . ".

The prompt 120 may be then fed to an inference engine 125, which is the LLM under evaluation, to get a completion 130. For example, the LLM may be based on Cohere v14.2, Cohere v15.5, Cohere v15.6, Llama2, etc. Then, different metrics may be assessed by one or more grading engines 135. The grading engine 135 may be a powerful LLM with better reasoning capability, such as GPT-4 or Llama2. The one or more grading engines 135 may comprise the same LLM or different LLMs.

In particular embodiments, each metric may be a question formulized as a metric prompt 140 with all or partial content of the completion 130 generated by the inference engine 125. For example, an example metric prompt 140*a* for the application of job posting generation may be "given the AI generated job qualification for a job posting, check the semantic variety . . . ". As another example, another example metric prompt 140*n* may be "given the AI generated job description for a job posting, check if it is relevant to . . . ".

The evaluation system may apply each metric prompt 140 to the grading engine 135, which may output a metric score 145, e.g., score 1 145*a*, score k 145*k*, . . . , score n 145*n*. The evaluation system may further perform thresholding 150, where the scores 145 are compared with thresholds to determine a final pass/fail label 155. Any criteria for assigning a pass/fail label 155 based on scores 145 may be used. For example, if any of the scores 145 are lower than the threshold, "fail" may be labeled; otherwise, "pass" may be labeled. The thresholds may be pre-defined by users based on the requirements of the application.

In particular embodiments, for each evaluation, the above process as shown in FIG. 1 may be run for multiple times, after which an average pass-rate may be calculated as a single-number performance indicator.

The details of each component shown in FIG. 1 are described below.

To integrate an LLM into an application, a prompt needs to be designed to ask the LLM to generate required content. A useful prompt may contain some user-specific information which may be inputted by the end user or injected by the other component of the system. Continuing with the example of job posting generation, the job role may be inputted by an end user. Therefore, in production scenario, the prompt may vary according to different user input. To capture the variability, a prompt template 105 with variables may be implemented instead of a fixed prompt. An example of the prompt template 105 for the application of job posting generation is shown below.

```
instructions
Your task is to write a job posting for the role of {req_title} for the company {company_name} in
the {division_name}.
The job posting should include multiple sections: summary, description, responsibilities,
qualifications.
The summary should be no more than 50 words.
Limit the responsibilities to no more than 10 items.
Limit the qualifications to no more than 10 items.
Format the response as an RFC8259 compliant JSON object in the following format:
{{
"summary": "<insert a short summary of the job position>",
"description": "<insert a medium paragraph to describe the job position>"
"responsibilities": [
<strictly no more than 10 items in this array>
],
"qualifications": [
<strictly no more than 10 items in this array>
]
}}
```

Particular embodiments may collect typical values of input variables 110 as testing data. Each data point may be stored in a JSON file where each of the key-value pairs specify the corresponding variable name and value. An example input variable file is shown below.

```
{
"req_title": "VP - International Consumer Banking - Model Risk Governance & Review Group",
"company_name": "JP Morgan Chase",
"division_name": "Global Finance division"
}
```

For one application, multiple data points (input variable files) may be collected to cover most of the production scenarios.

Particular embodiments also utilize metrics and scoring guidelines with human alignment. The metrics are developed according to human evaluation experience. In particular embodiments, the metrics are first developed for human evaluation, then converted for auto-evaluation. For each application, all the important criteria that need to be checked are specified. Then, guidelines are described to check each criterion according to domain knowledge. The goal of these guidelines is to guide a human annotator without domain knowledge to check a specific perspective of the LLM output by asking themselves questions and giving answers.

Continuing with the application of job posting generation, some of the example metrics are described below.

One example metric may be tone for LLM-based question answering. The tone metric may be calculated as a real value between 0 and 1. This metric may be used to assess whether the language and tone employed in the job posting are formal and business appropriate. For example, 0 means extremely bad and 1 means language and tone employed in the job posting are formal and business appropriate.

Another example metric may be natural language quality for LLM-based question answering. This metric may be calculated as a real value between 0 and 1. This metric may be used to evaluate the natural language quality of the text in the job posting, considering factors such as readability, coherence, grammatical correctness, clarity, etc. For example, 0 means extremely bad and 1 means natural language quality of the text is very good.

Another example metric may be variety for LLM-based question answering. This metric may be calculated as the minimum of variety-responsibilities and variety-qualifications. Variety-responsibilities may be a real value between 0 and 1. Variety-responsibilities may be used to evaluate how varied "responsibilities" are. Note that varied job responsibilities may also contain specific details instead of general concepts. For example, 0 means extremely bad and 1 means varied job responsibilities contain specific details instead of general concepts. Variety-qualifications may be a real value between 0 and 1. Variety-qualifications may be used to evaluate how varied "qualifications" are. Note that varied job qualifications may also contain specific details instead of general concepts. For example, 0 means extremely bad and 1 means varied job qualifications contain specific details instead of general concepts.

Another example metric may be repetitiveness for LLM-based question answering. This metric may be calculated as the minimum of repetitiveness-responsibilities, repetitiveness-qualifications, repetitiveness-responsibilities-in-description, and repetitiveness-qualifications-in-description. Repetitiveness-responsibilities may be a real value between 0 and 1. Repetitiveness-responsibilities may be used to evaluate how much "responsibilities" are repeating in wording. For example, 0 means extremely repeating and 1 means no repeating. Repetitiveness-qualifications may be a real value between 0 and 1. Repetitiveness-qualifications may be used to evaluate how much "qualifications" are repeating in wording. For example, 0 means extremely repeating and 1 means no repeating. Repetitiveness-responsibilities-in-description may be a real value between 0 and 1. Repetitiveness-responsibilities-in-description may be used to evaluate how much "responsibilities" are duplicated or replicated in "description". For example, 0 means all responsibilities are duplicated in description and 1 means no duplication. Note that summarizing or re-phrasing is not considered as duplication. Repetitiveness-qualifications-in-description may be a real value between 0 and 1. Repetitiveness-qualifications-in-description may be used to evaluate how much "qualifications" are duplicated or replicated in "description". For example, 0 means all qualifications are duplicated in description and 1 means no duplication. Note that summarizing or re-phrasing is not considered as duplication.

Another example metric may be content classification for LLM-based question answering. This metric may be calculated as the minimum content-classification-description and content-classification-responsibilities. Content-classification-description may be a real value between 0 and 1. Content-classification-description may be used to evaluate how much "responsibilities" are appropriate and effective for job posting. For example, 0 means extremely bad and 1 means content is appropriate and effective. Content-classification-responsibilities may be a real value between 0 and 1. Content-classification-responsibilities may be used to evaluate how much "qualifications" are appropriate and effective for job posting. For example, 0 means extremely bad and 1 means content is appropriate and effective.

Another example metric may be content relevance for LLM-based question answering. This metric may be calculated as the minimum of content-relevance-summary, content-relevance-description, content-relevance-responsibilities, and content-relevance-qualifications. Content-relevance-summary may be a real value between 0 and 1. Content-relevance-summary may be used to evaluate how much "summary" is aligned with the job title, department and hints for job role. For example, 0 means extremely bad and 1 means "summary" is aligned with the job title, department and hints for job role perfectly. Content-relevance-description may be a real value between 0 and 1. Content-relevance-description may be used to evaluate how much "description" is aligned with job title, department and hints for job role. For example, 0 means extremely bad and 1 means "description" is aligned with the job title, department and hints for job role perfectly. Content-relevance-responsibilities may be a real value between 0 and 1. Content-relevance-responsibilities may be used to evaluate how much "responsibilities" are aligned with the job title, department and hints for the job role. For example, 0 means extremely bad and 1 means "responsibilities" are aligned with the job title, department and hints for job role perfectly. Content-relevance-qualifications may be a real value between 0 and 1. Content-relevance-qualifications may be used to evaluate how much "qualifications" are aligned with the job title, department and hints for job role. For example, 0 means extremely bad and 1 means "qualifications" are aligned with the job title, department and hints for job role perfectly.

Another example metric may be JSON format for rule-based JSON checking. This metric may comprise JSON-format-is-json, JSON-format-json-type, JSON-format-key, and JSON-format-value-type, each of which is binary. The evaluation output using JSON-format-is-json may be a valid JSON string. The evaluation output using JSON-format-json-type may be a valid JSON object string (i.e., a "dict" in python), not a JSON array string (i.e., "list" in python). The evaluation output using JSON-format-key may be a JSON object containing only the following keys: "summary", "description", "responsibilities", and "qualifications". The evaluation output using JSON-format-value-type may be value types. For example, the value types of each key may include "summary": text; "description": text; "responsibilities": list; and "qualifications": list.

Another example metric may be length for rule-based word counting. This metric may be calculated as the minimum of length-total and length-summary, each of which is binary. Length-total may be evaluated based on whether the whole post contains at most 500 words. Length-summary may be evaluated based on whether the "summary" section contains at most 75 words.

check and evaluate the LLM output. LLM such as GPT-4 may be powerful enough to understand text content. By converting these guidelines to metric prompts 140 (e.g., injecting a guideline into a corresponding metric prompt 140), particular embodiments may also enable an evaluating LLM such as GPT-4 to check and evaluate the LLM output.

Particular embodiments may further improve the accuracy and consistency of LLM based evaluation by leveraging the few-shot in-context learning technique to implement the metric prompts 140. As noted above, subjective metrics may be difficult to accurately and consistently evaluate LLMs, even for human evaluation, because the abstract descriptions in the scoring guidelines or prompt instructions are usually insufficient to define them. According to the human evaluation experience, concrete examples may better convey the definition to human annotators. Therefore, the embodiments disclosed herein leverage few-shot in-context learning to improve the metric accuracy and consistency by injecting concrete examples into the metric prompts 140. These concrete examples may serve as demonstrations to further guide the evaluation by the LLM of the grading engine 135.

In particular embodiments, some metrics may be shared between different applications. As a result, these shareable metrics may be further abstracted as a re-usable function with argument and applied to different applications. An example metric function in the embodiments disclosed herein is demonstrated below.

```
def check_semantic_variety(items, item_type='text', item_type_plural='texts', engine='openai',
    **kwargs): question = f"""
        Evaluate the variety of the following list of {item_type_plural} based on their
semantic differences.
        Here are some demonstration examples for you.
        Input:
        <issue-1>
        My BlueBook laptop keeps overheating.
        </issue-1>
        <issue-2>
        The keyboard on my BlueBook laptop is unresponsive.
        </issue-2>
        <issue-3>
        I can't connect to Wi-Fi on my BlueBook laptop.
        </issue-3>
        Response:
        Semantic variety score: 80. The semantic variety score of 80 for the given input
        text is based on the following observations: 1. Different technical issues ... and the
        descriptions are specific enough to distinguish one problem from another clearly.
        ... < other input-response examples>
        Now here is the example that needs your response:
        """
    for i, item in enumerate(items):
        question += f'<{item_type }-{i + 1}>\n'
        question += f' {item } \n'
        question += f'</{item_type}-{i + 1}>\n'
    question += f'How semantically varied are these {item_type_plural } ?\n'
    question += 'Provide the rating in a scale of 0 to 100. Here, '
    question += f'0 stands for extremely uniform semantically so that all the {item_type_plural }
mean the same thing.
    question += f'100 stands for extremely varied semantically so that each {item_type} means a
different thing. '
    question += f'A rating score less than 50 means the list of {item_type_plural} lack variety in
semantic meaning. '
    question += f'A rating score higher than 50 represents that the list of {item_type_plural} are
varied in semantic meaning. \n'
    question += 'Your whole answer should contain the single scale number only.'
    answer = call_engine(question, engine, **kwargs)
    answer = re.findall('(?:[0-9]+)(?:\\.[0-9]+)?', answer)
    answer = 1.0 if len(answer) = = 0 else float(answer[0]) / 100.0
        return answer
```

The metrics with guidelines disclosed herein may enable a human annotator without domain knowledge to precisely In the above example, the metric function provides concrete few-shot demos together with reference scores for them. The metric function also includes explanations of the corresponding scores. The explanations may include specific reasons about why such a score value should be given. These detailed references may further instruct and guide the LLM of the grading engine 135 to evaluate future examples. The in-context examples/demos may be then combined with the rest of text generation instructions, forming the complete metric prompts 140. Due to the concrete and detailed few-shot demos in the prompts, both the accuracy and consistency of the grading by the LLM of the grading engine 135 may be improved.

As illustrated in FIG. 1, the evaluation system may further perform thresholding and calculate the pass-rate. Usually, an LLM may be required to perform consistently well for most real-world applications. Therefore, particular embodiments may evaluate an LLM by running the inference and/or generation multiple times and check the output from each run to make sure all of them are acceptable. In one embodiment, in each run, the evaluation system may generate a prompt 120, input the prompt 120 to the testing LLM 125, and determine the metrics for the output of the LLM 125. In an alternative embodiment, the evaluation system may generate a prompt 120 and then input the same prompt 120 to the testing LLM 125 in each run and determine the metrics for the output of the LLM 125 in each run accordingly.

A pass-rate may be reported as a single-number performance score. To obtain the pass rate, the evaluation system may examine a each metric of each run. If any of the metrics is less than the pre-defined threshold for one output in a run, the evaluation system may mark this run as "fail". Otherwise, the evaluation system may mark this run as "pass". In an embodiment, the evaluation system may use a default threshold 0.5 for all metrics. In another embodiment, the thresholds may be configurable metric-wise. Therefore, the auto evaluation may also align with users to implement different bars according to requirements of the application. Tables 1A-1C below show an example of the pass/fail labeling process, including detailed testing results of 10 runs for a data sample.

TABLE 1A

Testing results using some of the metrics.

| run | JSON-format-is-json | JSON-format-json-type | JSON-format-key | JSON-format-value-type | length-total | length-summary | variety-responsibilities | variety-qualifications |
|---|---|---|---|---|---|---|---|---|
| 1 | 0 | 0 | 0 | 0 | 0 | 0 | 0 | 0 |
| 2 | 1 | 1 | 1 | 1 | 1 | 1 | 0.8 | 0.8 |
| 3 | 0 | 0 | 0 | 0 | 1 | 0 | 0 | 0 |
| 4 | 1 | 1 | 1 | 1 | 1 | 1 | 0.8 | 0.8 |
| 5 | 1 | 1 | 1 | 1 | 0 | 1 | 0.8 | 0.9 |
| 6 | 1 | 1 | 1 | 1 | 1 | 1 | 0.8 | 0.8 |
| 7 | 1 | 1 | 1 | 1 | 1 | 1 | 0.8 | 0.9 |
| 8 | 1 | 1 | 1 | 1 | 1 | 1 | 0.8 | 0.8 |
| 9 | 1 | 1 | 1 | 1 | 1 | 1 | 0.8 | 0.8 |
| 10 | 1 | 1 | 1 | 1 | 1 | 1 | 0.8 | 0.9 |

TABLE 1B

Testing results using some other of the metrics.

| run | repetitiveness-responsibilities | repetitiveness-qualifications | repetitiveness-responsibilities-in-description | repetitiveness-qualifications-in-description | content-classification-description | content-classification-responsibilities |
|---|---|---|---|---|---|---|
| 1 | 0 | 0 | 0 | 0 | 0 | 0 |
| 2 | 0.8 | 1 | 0.8 | 1 | 1 | 1 |
| 3 | 0 | 0 | 0 | 0 | 0 | 0 |
| 4 | 0.6 | 0.8 | 0.6 | 1 | 1 | 1 |
| 5 | 0.6 | 0.8 | 0.8 | 1 | 1 | 1 |
| 6 | 1 | 1 | 0.4 | 1 | 1 | 1 |
| 7 | 0.8 | 1 | 1 | 1 | 0.9 | 1 |
| 8 | 0.8 | 1 | 0.8 | 1 | 1 | 1 |
| 9 | 1 | 1 | 1 | 1 | 1 | 1 |
| 10 | 0.8 | 1 | 0.2 | 1 | 1 | 1 |

TABLE 1C

Testing results using some other of the metrics and the pass-rate for each run.

| run | classification-content-qualifications | content-relevance-summary | content-relevance-description | content-relevance-responsibilities | content-relevance-qualifications | natural language quality | tone | pass-rate |
|---|---|---|---|---|---|---|---|---|
| 1 | 0 | 0 | 0 | 0 | 0 | 0 | 0 | 0 |
| 2 | 1 | 1 | 1 | 1 | 1 | 1 | 1 | 1 |
| 3 | 0 | 0 | 0 | 0 | 0 | 0 | 0 | 0 |
| 4 | 1 | 1 | 1 | 1 | 1 | 1 | 1 | 1 |
| 5 | 1 | 1 | 1 | 1 | 1 | 1 | 1 | 0 |

TABLE 1C-continued

| | Testing results using some other of the metrics and the pass-rate for each run. | | | | | | | |
|---|---|---|---|---|---|---|---|---|
| run | classification-content-qualifications | content-relevance-summary | content-relevance-description | content-relevance-responsibilities | content-relevance-qualifications | natural language quality | tone | pass-rate |
| 6 | 1 | 1 | 1 | 1 | 1 | 1 | 1 | 0 |
| 7 | 1 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 1 |
| 10 | 1 | 1 | 1 | 1 | 1 | 1 | 1 | 0 |

As can be seen, for run number 1 and run number 3, all metrics are 0, which indicates these two runs failed. For run number 5, the metric "length-total" is 0, so this run also failed. For run number 6 and run number 10, the metric "repetitiveness-responsibilities-in-description" are 0.4 and 0.2 respectively. Since both are less than the default threshold 0.5, these two runs also failed. Therefore, run number 1, run number 3, run number 5, run number 6, and run number 10 failed, whereas run number 2, run number 4, run number 7, run number 8, and run number 9 passed.

After generating the pass/fail label for multiple runs, the evaluation system may calculate the pass-rate as the ratio of passes among all the runs. The pass rate of the aforementioned example is 0.5 or 50%. In particular embodiments, for one use case, there may be multiple testing data points represented as input variable files. Accordingly, the evaluation system may calculate an average pass-rate across the whole testing dataset. Table 2 illustrates an example of calculating an average pass-rate for multiple testing data points.

TABLE 2

| Average pass-rate for multiple examples. | |
|---|---|
| | pass-rate |
| example-001 | 0.5 |
| example-002 | 0.4 |
| example-003 | 0.2 |
| average pass-rate | 0.366667 |

As can be seen in Table 2, there are 3 data points. Each data point may be run 10 times. For "example-001", 5 runs out of 10 runs passed. For "example-002", 4 runs out of 10 runs passed. For "example-003", 2 runs out of 10 runs passed. Therefore, 11 runs out of 30 runs passed in total, for which the average pass-rate for this testing is calculated as 11/30-0.366667.

In particular embodiments, the evaluation system may also generate a summarization of the detailed metrics. The evaluation system may firstly aggregate metrics to groups for each run by taking the minimum of the metrics values.

Then the evaluation system may average the grouped values across different runs and different data points. Table 3 shows an example summary table including the summarized metrics and pass-rates together.

TABLE 3

| | | | | | content-classification | content-relevance | | | |
|---|---|---|---|---|---|---|---|---|---|
| | JSON | length | variety | repetitiveness | | | nlquality | tone | pass-rate |
| example-001 | 0.8 | 0.7 | 0.64 | 0.52 | 0.79 | 0.8 | 0.8 | 0.8 | 0.5 |
| example-002 | 0.8 | 0.8 | 0.48 | 0.39 | 0.8 | 0.78 | 0.78 | 0.8 | 0.4 |
| example-003 | 0.8 | 0.7 | 0.54 | 0.4 | 0.704 | 0.74 | 0.774 | 0.8 | 0.2 |
| Average | 0.8 | 0.733333 | 0.553333 | 0.436667 | 0.764667 | 0.773333 | 0.784667 | 0.8 | 0.366667 |

The summarized values of metrics may be useful for LLM error analysis. However, the pass-rate may be the most important indicator of LLM performance. Higher pass-rate may indicate the LLM consistently performs well for the specific use case.

FIG. 2 illustrates an example method 200 for application specific evaluation of an LLM, according to at least one embodiment. The method may begin at step 210, where the evaluation system may generate, based on information associated with a first task, a prompt configured for eliciting outputs from large language models (LLMs). At step 220, the evaluation system may input the prompt to a first LLM, wherein the first LLM is configured to output a response based on processing the prompt. At step 230, the evaluation system may determine, based on the first task, one or more metrics for evaluating the first LLM, wherein each of the metrics is associated with a scoring guideline. At step 240, the evaluation system may generate one or more metric prompts based on the one or more respective metrics and the one or more scoring guidelines associated with the one or more respective metrics. At step 250, the evaluation system may input the response and the one or more metric prompts to one or more second LLMs, wherein the one or more second LLMs are configured to output one or more scores corresponding to the one or more respective metrics based on processing the response and the metric prompts. At step 260, the evaluation system may determine one or more thresholds for the one or more metrics, respectively. At step 270, the evaluation system may compare the one or more scores with the one or more thresholds, respectively. At step 280, the evaluation system may determine whether the first LLM passes or fails the evaluation based on the comparison. If the first LLM passes the evaluation, the evaluation system may generate an analysis report comprising an indication that the first LLM passes the evaluation at step 290a. If the first LLM fails the evaluation, the evaluation system may generate an analysis report comprising an indication that the first LLM fails the evaluation at step 290*b*. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for application specific evaluation of an LLM including the particular steps of the method of FIG. 2, this disclosure contemplates any suitable method for application specific evaluation of an LLM including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
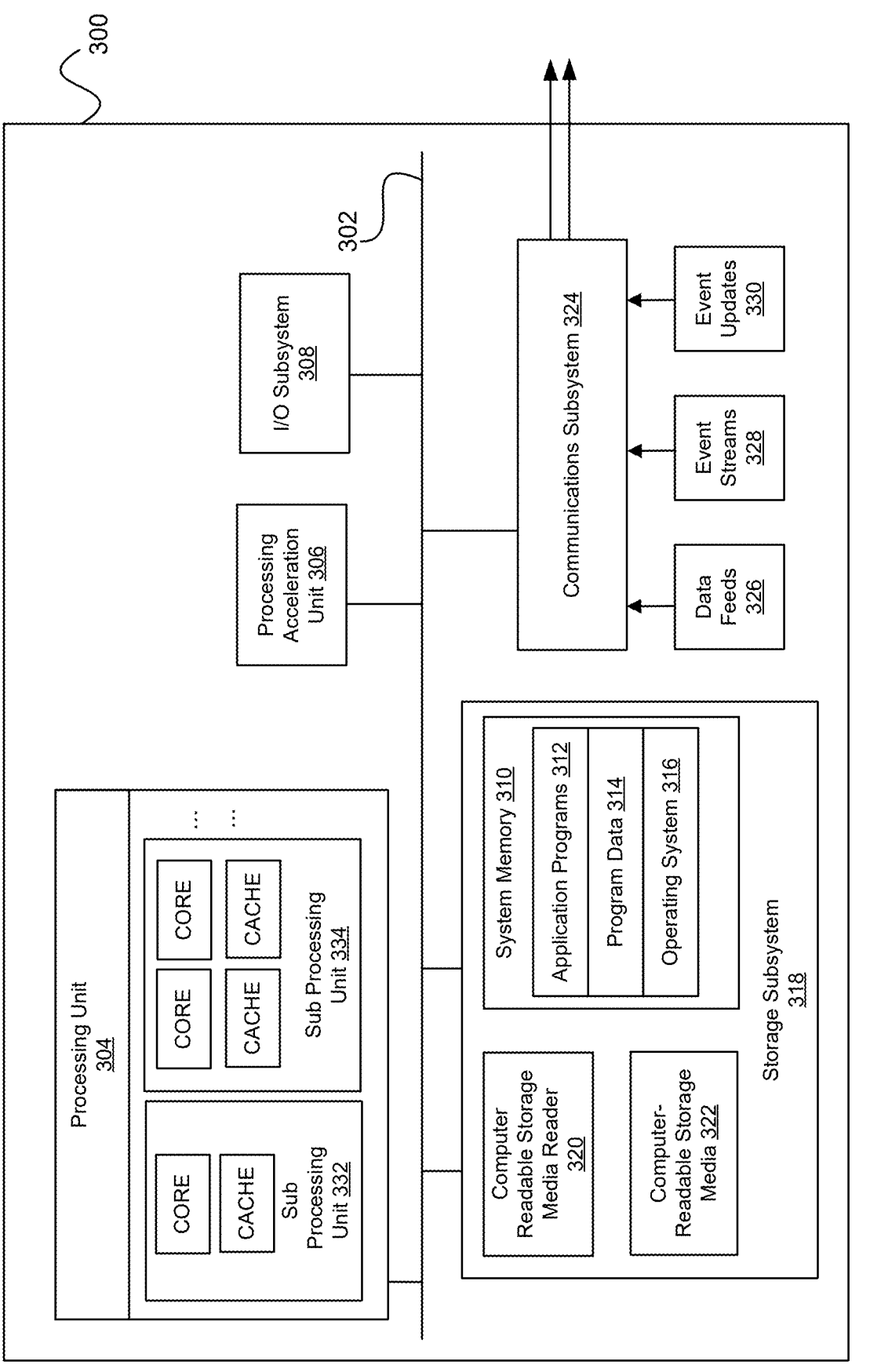
FIG. 3 illustrates an example computer system, in which various embodiments may be implemented.

FIG. 3 illustrates an example computer system 300, in which various embodiments may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 304 provide the functionality described above. Storage subsystem 318 may also provide a repository for storing data used in accordance with the present disclosure.

As depicted in the example in FIG. 3, storage subsystem 318 can include various components including a system memory 310, computer-readable storage media 322, and a computer readable storage media reader 320. System memory 310 may store program instructions that are loadable and executable by processing unit 304. System memory 310 may also store data that is used during the execution of the instructions and/or data that is generated during the execution of the program instructions. Various different kinds of programs may be loaded into system memory 310 including but not limited to client applications, Web browsers, mid-tier applications, relational database management systems (RDBMS), virtual machines, containers, etc.

System memory 310 may also store an operating system 316. Examples of operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 300 executes one or more virtual machines, the virtual machines along with their guest operating systems (GOSs) may be loaded into system memory 310 and executed by one or more processors or cores of processing unit 304.

System memory 310 can come in different configurations depending upon the type of computer system 300. For example, system memory 310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 310 may include a basic input/output system (BIOS) containing basic routines that help to transfer information between elements within computer system 300, such as during start-up.

Computer-readable storage media 322 may represent remote, local, fixed, and/or removable storage devices plus storage media for temporarily and/or more permanently containing, storing, computer-readable information for use by computer system 300 including instructions executable by processing unit 304 of computer system 300.

Computer-readable storage media 322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Machine-readable instructions executable by one or more processors or cores of processing unit 304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory computer-readable media storing instructions that, when executed by one or more processors, cause performance of:

generating, based on information associated with a first task, a prompt configured for eliciting outputs from large language models (LLMs);

inputting the prompt to a first LLM, wherein the first LLM is configured to output a response based on processing the prompt;

determining, based on the first task, one or more metrics for evaluating the first LLM, wherein each of the metrics is associated with a scoring guideline;

generating one or more metric prompts based on the one or more respective metrics and the one or more scoring guidelines associated with the one or more respective metrics;

inputting the response and the one or more metric prompts to one or more second LLMs, wherein the one or more second LLMs are configured to output one or more scores corresponding to the one or more respective metrics based on processing the response and the metric prompts; and generating an analysis report based on the one or more metrics and their corresponding scores.

2. The media of claim 1, wherein the instructions when executed by the processors, cause further performance of:

generating one or more examples for each of the one or more metrics; and injecting the examples to each of the metric prompts associated with the respective metric.

3. The media of claim 2, wherein each of the examples comprises one or more of:

a demo;

a reference score for the demo; or an explanation for the reference score.

4. The media of claim 1, wherein the instructions when executed by the processors, cause further performance of:

determining one or more thresholds for the one or more metrics, respectively;

comparing the one or more scores with the one or more thresholds, respectively; and determining whether the first LLM passes or fails the evaluation based on the comparison.

5. The media of claim 4, wherein the instructions when executed by the processors, cause further performance of:

determining all the metrics exceed their respective thresholds;

based at least in part on said determining all the metrics exceed their respective thresholds, determining the first LLM passes the evaluation; and wherein the analysis report comprises an indication that the first LLM passes the evaluation.

6. The media of claim 4, wherein the instructions when executed by the processors, cause further performance of:

determining one or more of the metrics are lower than their corresponding thresholds;

based at least in part on said determining one or more of the metrics are lower than their corresponding thresholds, determining the first LLM fails the evaluation; and wherein the analysis report comprises an indication that the first LLM fails the evaluation.

7. The media of claim 4, wherein the one or more thresholds are determined based on one or more requirements associated with the first task.

8. The media of claim 4, wherein the instructions when executed by the processors, cause further performance of:

inputting the prompt to the first LLM for a plurality of respective times, wherein the first LLM is configured to output a plurality of respective responses based on processing the prompt for the plurality of respective times;

determining, by the one or more second LLMs, a plurality of sets of one or more scores corresponding to the one or more respective metrics based on processing the plurality of response and the metric prompts; and calculating a pass-rate for the first LLM based on determining whether the first LLM passes or fails the evaluation for each of the plurality of times;

wherein the analysis report comprises the pass-rate.

9. The media of claim 1, wherein the instructions when executed by the processors, cause further performance of:

generating, based on one or more of the metric prompts, one or more metric functions configured to be re-used for one or more second tasks.

10. The media of claim 1, wherein generating the prompt is based on a prompt template and one or more input variables associated with the first task.

11. The media of claim 10, wherein each of the input variables comprises a pair of variable name and value.

12. The media of claim 1, wherein the metrics comprise one or more of tone, natural language quality, variety, repetitiveness, content classification, content relevance, JSON format, or length.

13. The media of claim 1, wherein one or more of the metrics are shareable between the first task and one or more second tasks.

14. The media of claim 1, wherein the one or more second LLMs are based on a same model.

15. The media of claim 1, wherein one or more of the second LLMs are based on different models.

16. A system comprising: one or more processors; and a non-transitory memory coupled to the processors comprising instructions, when executed using the processors, cause the system to execute:

generating, based on information associated with a first task, a prompt configured for eliciting outputs from large language models (LLMs);

inputting the prompt to a first LLM, wherein the first LLM is configured to output a response based on processing the prompt;

determining, based on the first task, one or more metrics for evaluating the first LLM, wherein each of the metrics is associated with a scoring guideline;

generating one or more metric prompts based on the one or more respective metrics and the one or more scoring guidelines associated with the one or more respective metrics;

inputting the response and the one or more metric prompts to one or more second LLMs, wherein the one or more second LLMs are configured to output one or more scores corresponding to the one or more respective metrics based on processing the response and the metric prompts; and generating an analysis report based on the one or more metrics and their corresponding scores.

17. The system of claim 16, wherein the instructions when executed using the processors, cause the processors to further execute:

generating one or more examples for each of the one or more metrics; and injecting the examples to each of the metric prompts associated with the respective metric.

18. The system of claim 16, wherein the instructions when executed using the processors, cause the processors to further execute:

determining one or more thresholds for the one or more metrics, respectively;

comparing the one or more scores with the one or more thresholds, respectively; and determining whether the first LLM passes or fails the evaluation based on the comparison.

19. A method comprising, by one or more computing systems:

generating, based on information associated with a first task, a prompt configured for eliciting outputs from large language models (LLMs);

inputting the prompt to a first LLM, wherein the first LLM is configured to output a response based on processing the prompt;

determining, based on the first task, one or more metrics for evaluating the first LLM, wherein each of the metrics is associated with a scoring guideline;

generating one or more metric prompts based on the one or more respective metrics and the one or more scoring guidelines associated with the one or more respective metrics;

inputting the response and the one or more metric prompts to one or more second LLMs, wherein the one or more second LLMs are configured to output one or more scores corresponding to the one or more respective metrics based on processing the response and the metric prompts; and generating an analysis report based on the one or more metrics and their corresponding scores.

20. The method of claim 19, further comprising:

generating one or more examples for each of the one or more metrics; and injecting the examples to each of the metric prompts associated with the respective metric.

* * * * *